United States Patent
Pandya et al.

(10) Patent No.: US 7,707,188 B2
(45) Date of Patent: Apr. 27, 2010

(54) SYSTEM AND METHOD FOR ELECTRONIC ARCHIVAL AND RETRIEVAL OF DATA

(75) Inventors: Yogendra C. Pandya, Austin, TX (US); Cyril Laroche-Py, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 926 days.

(21) Appl. No.: 10/327,629

(22) Filed: Dec. 20, 2002

(65) Prior Publication Data

US 2004/0122872 A1 Jun. 24, 2004

(51) Int. Cl.
G06F 17/00 (2006.01)

(52) U.S. Cl. .................. 707/668; 707/670; 707/671; 707/672; 707/673; 711/161

(58) Field of Classification Search ............. 707/101, 707/204, 104.1; 709/236; 711/161
See application file for complete search history.

(56) References Cited

U.S. PATENT DOCUMENTS

| | | | |
|---|---|---|---|
| 4,350,979 A | | 9/1982 | Eberwein |
| 4,414,651 A | | 11/1983 | Buckner |
| 5,530,899 A | * | 6/1996 | MacDonald ............. 710/17 |
| 5,764,972 A | * | 6/1998 | Crouse et al. ............. 707/1 |
| 5,774,420 A | | 6/1998 | Heysse et al. |
| 5,813,009 A | * | 9/1998 | Johnson et al. ........... 707/100 |
| 5,832,514 A | * | 11/1998 | Norin et al. ............. 707/202 |
| 6,035,412 A | * | 3/2000 | Tamer et al. ............. 714/6 |
| 6,044,405 A | * | 3/2000 | Driscoll et al. ........... 709/232 |
| 6,317,742 B1 | * | 11/2001 | Nagaratnam et al. ....... 707/9 |
| 6,338,092 B1 | * | 1/2002 | Chao et al. ............. 709/236 |
| 6,519,568 B1 | * | 2/2003 | Harvey et al. ........... 705/1 |
| 6,532,434 B1 | | 3/2003 | West |
| 6,574,733 B1 | * | 6/2003 | Langford ............... 713/194 |
| 6,609,138 B1 | * | 8/2003 | Merriam ............... 707/204 |
| 6,725,237 B2 | * | 4/2004 | Clairmont et al. ........ 707/104.1 |
| 6,856,970 B1 | * | 2/2005 | Campbell et al. ......... 705/35 |
| 6,898,687 B2 | * | 5/2005 | Wu et al. .............. 711/173 |
| 2002/0042833 A1 | * | 4/2002 | Hendler et al. ........... 709/231 |
| 2002/0147844 A1 | * | 10/2002 | Denecheau et al. ........ 709/245 |
| 2008/0126415 A1 | * | 5/2008 | Chaudhury et al. ....... 707/104.1 |

* cited by examiner

*Primary Examiner*—Don Wong
*Assistant Examiner*—Hanh B Thai
(74) *Attorney, Agent, or Firm*—Myron K. Stout

(57) ABSTRACT

A data archival system for the automated archiving of data files. The data archival system includes a central processing hub for receiving the data files, a data archival facility connected to the central processing hub; and an archival manager which is configured to cause the transmission of the data files from the central processing hub to the data archival facility in response to an archive request; the archival of the data files transmitted to the data archival facility in response to an archive request; the retrieval of the data files previously archived in response to a retrieval request; and the transmission of the retrieved data files from the data archival facility to the central processing hub.

15 Claims, 5 Drawing Sheets

SYSTEM AND METHOD FOR ELECTRONIC ARCHIVAL AND RETRIEVAL OF DATA

BACKGROUND

1. Field of the Present Invention

The present invention generally relates to the field of data processing; and more particularly to a system and method for electronically archiving and retrieving archived data between a central data processing facility and an associated data archival facility.

2. History of Related Art

In the field of data processing, the demand for the timely and efficient archival of data and retrieval of archived data continues to grow. For example, in the oil and gas industry, the need exists to remotely archive and retrieve large amounts of data. Operating companies that own and/or manage hydrocarbon wells generally evaluate the wells by a process known as wireline logging. In wireline logging, one or more tools are connected to a power and data transmission cable or "wireline" and are lowered into the well borehole to obtain measurements of geophysical properties for the area surrounding the borehole. The wireline supports the tools as they are lowered into the borehole, supplies power to the tools, and provides a communication medium to send signals to the tools and receive data from the tools. Tools are typically lowered to a depth of interest in the well and are then retrieved. During the process, the tools typically collect and send data about the geological formations through which they pass through the wireline to the data acquisition and processing system at the surface.

The data acquisition and processing system compiles the data from the tools into a "log" (a plot which presents the geophysical information concerning the geological formations encountered by the well). Logs may be used to evaluate current production from producing wells or to inspect the integrity of production equipment in a producing well. In any case, the data gathered during the logging operation is generally presented on the log by depth, but may also be presented by time, or any other index by which multiple physical entries are recorded. The data acquisition and processing system may send the acquired log data to a viewing monitor, where the well logging professional conducting the logging operation can view the log data as it is being compiled.

The acquired log data is often crucial to the decision-making process with respect to operations (both ongoing and future) at the well. For example, regarding a well that has just been drilled and logged, the well could (depending on the log data) be drilled deeper, plugged and abandoned as non-productive, or cased and tested—or perhaps the decision will be that additional logs are required before the decision on the disposition of the well can be made. The operating company which is drilling or producing the well frequently desires to have its own personnel review the log data. The operating company, however, may be located half a world away from the well itself. Drilling and production activities are often located in remote locations and it is difficult (from both an expense and risk view) for the operating company to have its own personnel, such as a geologist or a petrophycist, on site during the logging operation. Often times, analysis of current log data requires the prompt retrieval and analysis of previously logged data. Thus, the acquired log data is typically transmitted to the operating company's headquarters or some other central repository for further interpretation and review.

Each operating company may have unique views about and preferences for what is needed. Some operating companies may focus only on current data and others may have a need to also review historical data. The rapid advances in electronic communications and web-based central data processing facilities permit clients to demand ever faster and reliable data management. Further, as the complexity of data evaluation tools increases, post acquisition interpretation and processing of data becomes an integral part of the data delivery system. The exploration and production industry is no exception to this trend. It not only desires time-efficient data acquisition, but also desires efficient management of the data once acquired, including the efficient archival and retrieval of transmitted data. To assist them, the operating companies may have one or more service partners to provide technology, processes, and services that bring increased operating efficiency at reduced costs. Generally, the services provided by these partners include the processing, management, and delivery of log data.

The service partners providing the processing, management, and delivery services typically employ one or more central data processing facilities each of which is connected to one or more data archival facilities. Generally, the archival and retrieval of data between the various facilities is conducted in an inefficient manner; with any errors in the archival and retrieval process requiring significant manual intervention to not only correct the failure, but to determine the origin of the failure as well.

Accordingly, it would be beneficial to implement a system and method for the efficient archival and retrieval of data between a central data processing facility and the data archival facilities utilized by such central data processing facility.

One aspect of the invention relates to data archival systems for implementing an archival process on a plurality of data files. A data archival system in accordance with one embodiment of the invention includes: a central processing hub configured to receive the plurality of data files; a data archival facility connected to the central processing hub and configured to archive the plurality of data files; and an archival manager configured to cause a) transmission of at least one of the plurality of data files from the central processing hub to the data archival facility in response to an archive request; b) archival of at least one of the plurality of data files transmitted to the data archival facility in response to an archive request; c) retrieval of at least one of the plurality of data files previously archived in response to a retrieval request; and d) transmission of at least one of the retrieved data files from the data archival facility to the central processing hub.

Another aspect of the invention relates to methods for archiving a plurality of data files between a central data processing facility and a data archival facility. A method in accordance with one embodiment of the invention includes: a) responsive to receiving an archive session request, validating the plurality of data files associated with the archive session request; b) responsive to a successful validation of the archive session request, transmitting the validated data files from the central data processing facility to the data archival facility; c) responsive to receiving the validated data files at the data archival facility, validating the received data files for archival; and d) responsive to a successful validation of the received data files, archiving the received data files.

Another aspect of the invention relates to computer-readable media having programs that implement methods of the invention. A computer-readable medium in accordance with one embodiment of the invention has a program having machine-readable instructions for causing a processor to perform a method for archiving a plurality of data files between a central data processing facility and a data archival facility, the method comprising: a) responsive to receiving an archive session request, validating the plurality of data files associated with the archive session request; b) responsive to a successful validation of the archive session request, transmitting the validated data files from the central data processing facility to the data archival facility; c) responsive to receiving the validated data files at the data archival facility, validating the received data files for archival; and d) responsive to a successful validation of the received data files, archiving the received data files.

Other aspects and advantages of the invention will be come apparent from the following description and the attached claims.

BRIEF DESCRIPTION OF THE DRAWINGS

Objects and advantages of the invention will become apparent upon reading the following detailed description and upon reference to the accompanying drawings in which.

Figure 1:
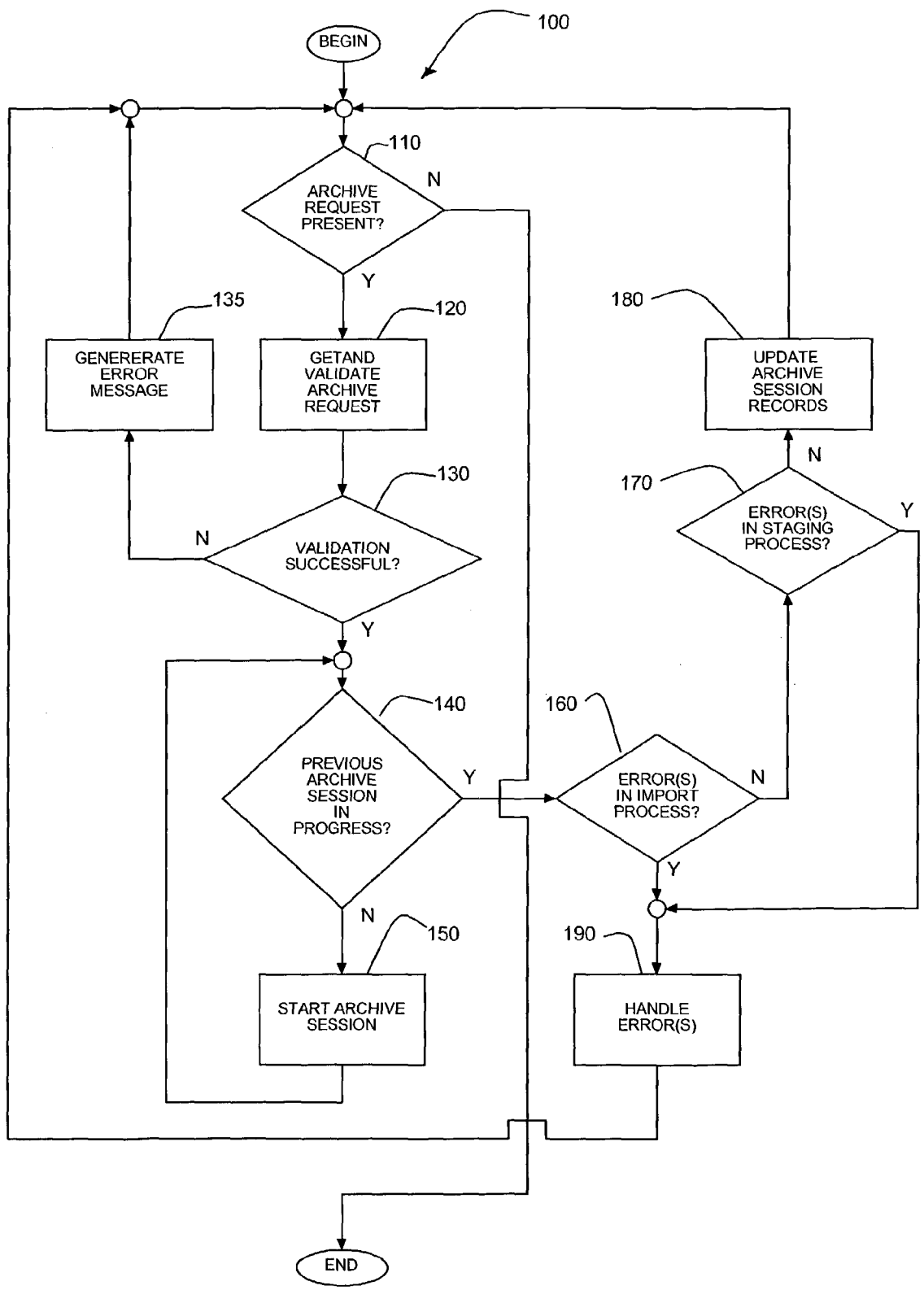
FIG. 1 is a flow diagram of a method of processing requests to archive data according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the invention is limited only by the language of the appended claims.

DETAILED DESCRIPTION OF THE INVENTION

Generally speaking, the present invention contemplates a data archival system and method for efficiently archiving data and retrieving archived data between a central data processing facility and its corresponding data archival facility. The invention utilizes an automated archival manager to process the archival and retrieval of data between a central data processing facility (hereinafter, a "central hub") and a data archival facility (hereinafter, an "archival facility") which archival facility may or may not be co-located with the central hub. The archival manager preferably resides within both the central hub and the archival facility, processes and monitors all requests made to the central hub for the archival and/or retrieval of data, coordinates the archival and retrieval of data files between the central hub and archival facility, and analyzes process errors so as to optimize the archival and retrieval process and minimize operator intervention. Throughout the description and the drawings, elements which are the same will be accorded the same reference numerals.

FIG. 1 depicts a flow diagram illustrating an embodiment of a method 100 of the present invention for processing requests at a central hub to archive data. Generally, for each archive session request received at the central hub, method 100 validates the archive session request, transmits the data files associated with the archive session request to the archival facility, determines the archival status of data files associated with previously submitted archive session requests, and updates the archive catalog accordingly to reflect the archival status.

In the depicted embodiment, if an archive session request is present (block 110), the archive session request and the data files associated with the archival session request are retrieved and validated (block 120). While not expressly shown in FIG. 1, each archive session request may include one or more data files associated with the session request. In the oil and gas industry, log data may typically be delivered to the central hub in several formats (all of which are well known in the prior art). For example, graphics are typically delivered in a format referred to as Picture Description Standard (PDS). Digital data, on the other hand, is typically delivered in either a Log ASCII Standard (LAS) format or Digital Log Interchange Standard (DLIS) format. Data files may include data provided in the PDS, LAS, DLIS, or other formats. Depending on the format utilized, validation of each data file may include verifying the data's format and origin and validating the same against pre-defined or user selectable fields or rules. For example, in one embodiment of the present invention, the applicable well information is validated against the applicable client information to ensure the applicable data files are associated with the proper client.

If the validation fails (block 130), the processing of the current archive session request of the data file that failed validation is halted, an error report may be generated (block 135), and processing continues with the next data file of the current archive session request. The generated error report may include information on the nature and type of validation error and other information regarding the applicable archive session request and data file in which the error occurred so as to assist system operators with resolving the validation error. If the validation error is corrected and the data file passes validation, its reference is maintained in the current archive session request. If the validation error is not corrected, the reference for data file that failed validation is removed from the current archive session request.

If the archive session request and associated data files are successfully validated, a determination is made as to whether an existing archive session is underway or pending (i.e., the transmission of data files for an existing archive session request to the archival facility has not yet completed) (block 140). In a preferred embodiment of the present invention, a semaphore file associated with the data files being transmitted is utilized to signify the transmission status of the data files to the archival facility. Specifically, the central hub transmits to the archival facility a designated file (i.e., a semaphore file) together with the data files associated with the archive session request. The existence of the semaphore file signifies that an archive session request is in progress. Upon completing the transmission of the applicable data files associated with the archive session request to the archival facility, the semaphore file is deleted to indicate that the transmission of the applicable data files has completed and that the data files associated with the archive session request are now present at the archival facility. Other embodiments utilize status flags to signify the transmission status of the data files to the archival facility.

If an existing archive session request is not underway, a new archive session is started (block 150) to process the current archive request. Processing of the current archival session request (block 150) includes: recording certain information regarding the archival session to facilitate records management, transmitting the data files to be archived to the archival facility (including re-transmission of applicable data files not received at the archival facility, confirming receipt of the data files at the archival facility, signaling the archival facility that transmission of applicable data files is complete, and updating the archival session records to indicate that an archival session is now underway). The information recorded may include the name and machine identification of the end-user making the archive session request, time that the archive session is commenced, the applicable well name, client name, size of the data files to be archived, and the current status of the archive session request. If an archive session is currently underway (block 140), a determination is made as to whether any errors in the archival of the data files (associated with the applicable archive session request) at the archival facility have been encountered (blocks 160 and 170).

In a preferred embodiment of the present invention (the details of which are set forth in FIG. 2), data files associated with an archive session request are first received by the archival facility into a temporary storage area (i.e., receive area) and then transferred to a staging area for further processing and archival. The transfer from the receive area to the staging area is hereinafter referred to as the import process, and the further processing and archival of the data files transferred from the receive area is hereinafter referred to as the staging process. Those skilled in the art will appreciate that the aggregate amount of data permitted to be associated with a session request may be limited after taking into consideration relevant storage and transmission bandwidth parameters. For example, in a preferred embodiment of the present invention, the aggregate file size for all data files associated with an archival session is restricted to one gigabyte. In alternative embodiments, the aggregate file size restriction for all data files associated with an archival session is configurable by the system operator or may be restricted to a size based upon available data throughput between the central hub and the archival facility and the aggregate size of the data files previously received at the archival facility and pending for archival.

If no error occurred during the import process (block 160), a determination is then made as to whether an error occurred in the staging process (block 170). If no error occurred in the staging process, then the status of the archive session request is updated to reflect its completion (i.e., archival) at the archival facility, applicable catalog records at the central hub are updated to reflect the archival of the data files associated with the archive session request and that the applicable archive session request is no longer pending, and the process continues with the next archive session request. If, however, an error is encountered in the import process (block 160), the archival process is halted, information on the relevant data file and archive session request is recorded, and an error message with relevant data file information is displayed to the system operators for resolution (block 190). Those skilled in the art will appreciate that the resulting inability to enter into the staging process for the data files associated with the archive session request caused by an import process error, will halt all further archival processing of these data files until the applicable error in the import process is resolved. If an error occurs during the staging process (block 170), however, the archival process may or may not be halted with respect to each applicable data file, information for the relevant data file and archive session request will be recorded, and an error message with relevant data file and archive session request information is displayed to the system operators for resolution (block 190).

Figure 2:
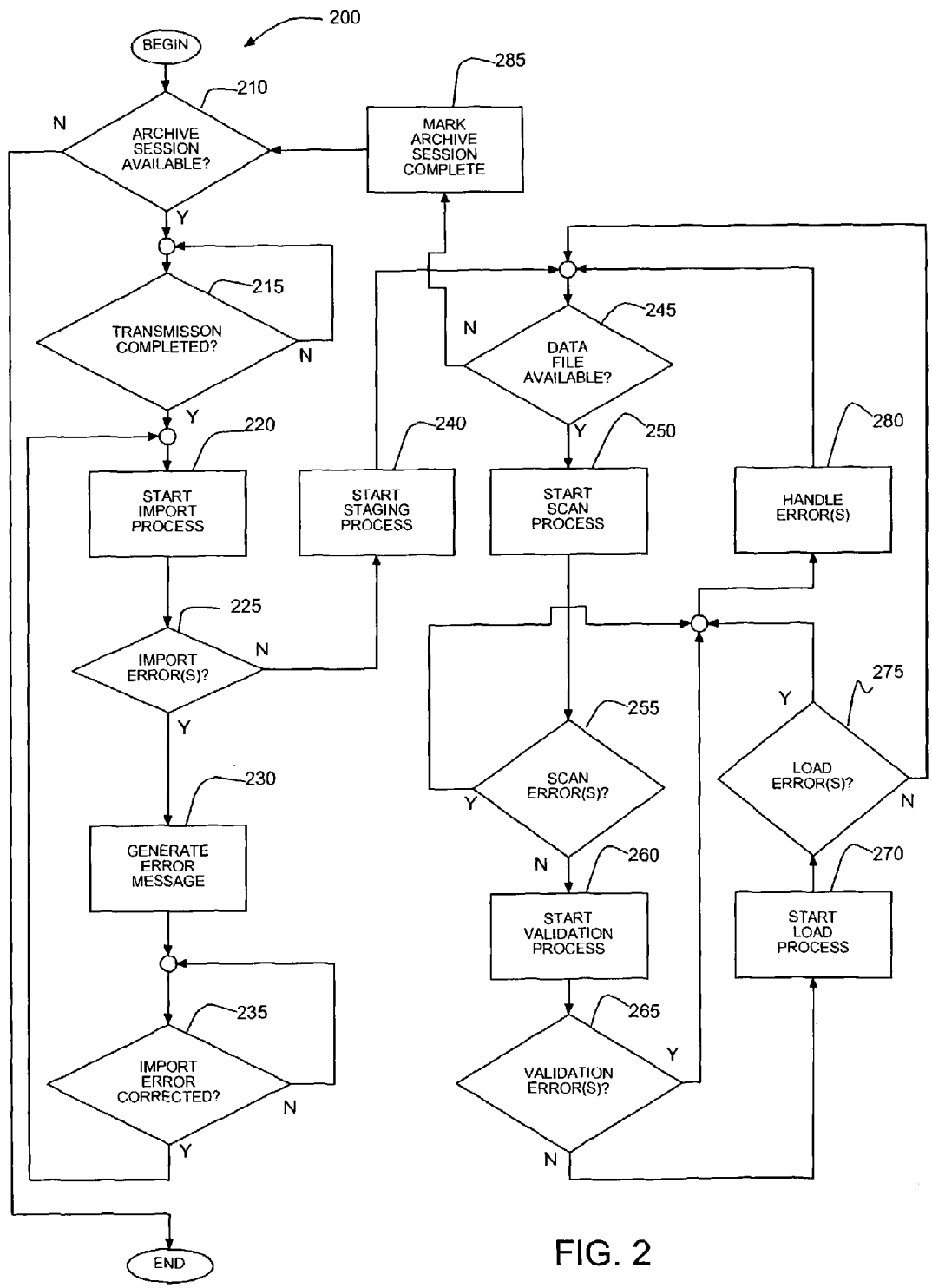
FIG. 2 is a flow diagram of a method of archiving data associated with an archival request according to one embodiment of the present invention.

FIG. 2 depicts a flow diagram of a method 200 of archiving data files received by the archival facility from the central hub as a result of the processing of an archive session request according to method 100 of the present invention. Generally, data files associated with an archive session request once received at the archival facility are imported from the receive area into a staging area. Once in the staging area, each data file is scanned and then validated prior to being archived. If no errors occur during the scan and validation processes, the data file is archived. Upon processing each of the data files associated with the archive session, applicable catalog files are maintained accordingly so that the central hub may update its archival catalog records accordingly.

In the depicted embodiment, a determination is made as to whether an archive session request is available for archival (block 210). If an archive session request is available for archival, a determination is made as to whether all data files associated with the archive session request have been received into the receiving area (block 215). When all of the data files associated with the archive session request have been received, the import process for the data files is commenced (block 220). If an import error is encountered during the import process (block 225), an error message is generated (block 230) and the archival process is halted until the import error is addressed (block 235). The error message may include relevant data file and archive session request information to aid the system operators in resolving the error.

If the import process is successful (block 225), the receive area is released (so that the data files associated with another archive session request may be transmitted to the archival facility), information on the import process is maintained for use by system operators, and the staging process is commenced for the imported data files. For each data file associated with the archive session request (block 245), the data is scanned (block 250), validated (block 260), and loaded (block 270). The scanning process may include extracting specific information such as applicable well name and activity date, and maintaining information on the scanning process for use by system operators. Using information obtained during the scanning process, the validation process serves as a quality control step to confirm the contents of each data file. As part of the validation process, information on the results of the validation may be maintained for use by system operators. The load process involves the actual archiving of the data file, updating the catalog at the archival facility, and maintaining information on the load process for use by system operators.

If any errors are detected during the scan process, the validation process, or the load process (blocks 255, 265, and 275, respectively), appropriate error messages containing information on the data file and archive session request are generated (utilizing the information maintained during each applicable process) so as to assist system operators with addressing the applicable error (block 280). When all of the data files associated with the archive session have been processed for archival, the current archive session request is marked as archived (block 285), and processing continues with the next archive session request until each archive session request is processed.

Figure 3:
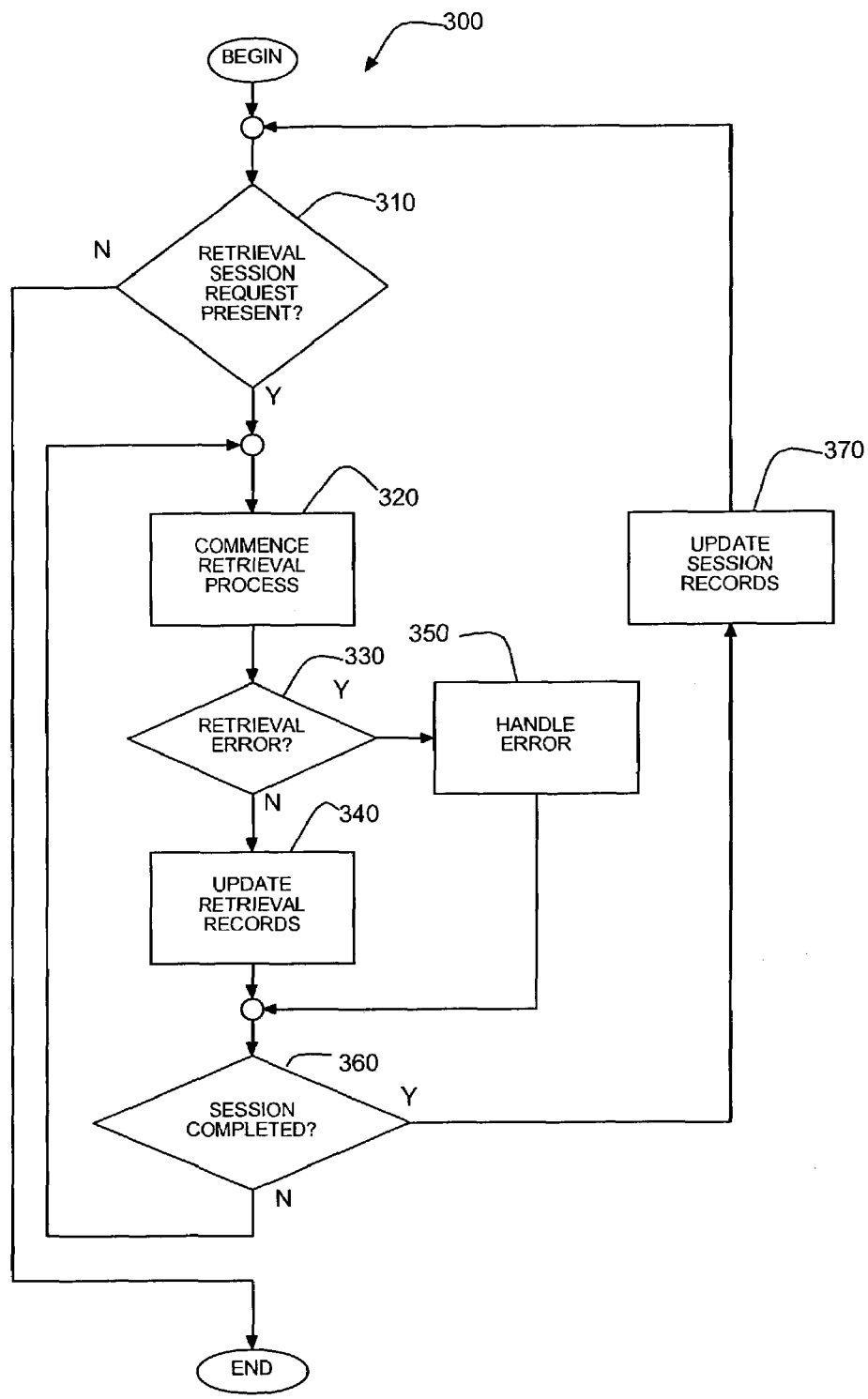
FIG. 3 is a flow diagram of a method of processing requests to retrieve archived data according to one embodiment of the present invention.

FIG. 3 depicts a flow diagram of a method 300 of processing retrieval session requests for archived data according to one embodiment of the present invention. Generally, for each retrieval session request, method 300 processes and transmits the retrieval session request to the archival facility for each of the data files associated with the retrieval session request, receives the applicable data files as they are made available by the archival facility, and updates the retrieval catalog accordingly.

In the depicted embodiment, if a retrieval session request is determined to be present (block 310), then a retrieval process is commenced for each data file (block 320). The retrieval process (block 320) includes transmitting a request to the archival facility for the applicable data file, determining if data files associated with the present request (or previous requests) are available for retrieval from the archival facility, and if so, retrieving available data files from the data archival facility.

If an error is encountered in the retrieval process (i.e., the data file is not available for retrieval, the retrieval may have failed, etc.) (block 330), an error message with relevant data file information is displayed to the system operators so as to permit the error to be addressed (block 350) and the retrieval process continues for the next data file. If the retrieval process is successful, the applicable retrieval records are updated to reflect the status of the retrieved data file (block 340). A determination is then made as to whether additional data files remain to be retrieved (block 360). If additional data files remain to be retrieved, processing then continues with the next data file (block 320). The process is continued until all data files associated with the retrieval session request are processed. When all data files for the retrieval session request have been processed (block 360), the archival records are updated for the current session request, and the next retrieval session request is processed (block 370).

Figure 4:
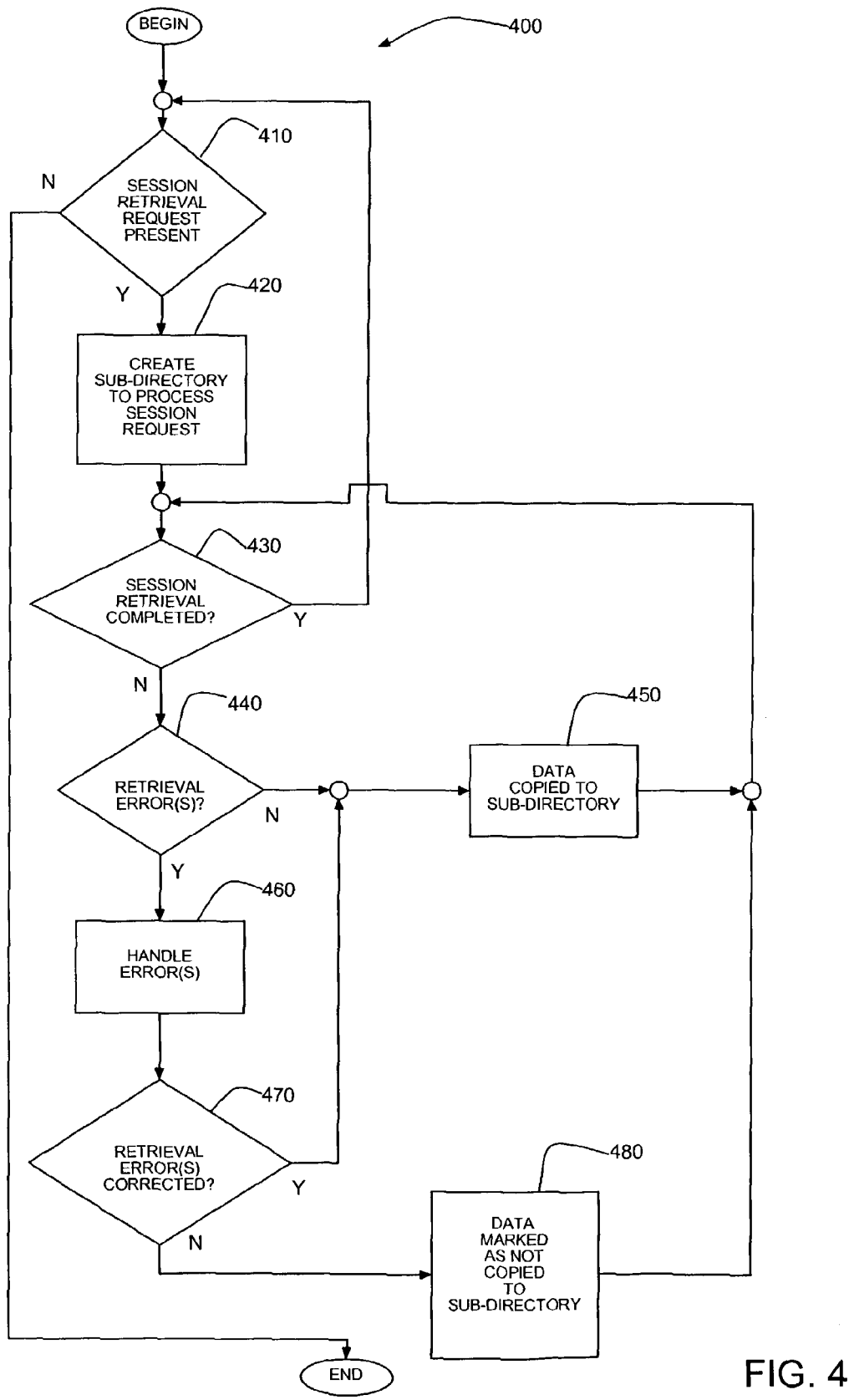
FIG. 4 is a flow diagram of a method of retrieving data associated with a retrieval request according to one embodiment of the present invention.

FIG. 4 depicts a flow diagram of a method 400 of retrieving data associated with a retrieval session request according to method 300 of the present invention. Generally, for each retrieval session request presented, method 400 creates a temporary storage area (i.e., receiving area) into which the requested data files are retrieved from archive, retrieves each data file into the temporary storage area, addresses any errors with the retrieval process, and updates the retrieval catalog records to indicate the retrieval status (i.e., successful or failed retrieval) for each data file.

In the depicted embodiment, upon determining that a retrieval session request is present (block 410), a temporary storage area is created to process the data files associated with the retrieval session request. For each data file associated with the retrieval session request, the applicable data file locator information is reviewed, the data file is retrieved from archive and copied into the temporary storage area and the applicable catalog records are updated so as to permit the retrieval of the data file from the temporary storage area (block 450). If an error is encountered with the retrieval of the data file from archive (i.e., the data file is not available for retrieval, the retrieval may have failed, etc.) (block 440), an error message with relevant data file information is displayed to the system operators so as to permit the error to be addressed. If the retrieval error is corrected (block 470), processing continues with the retrieval and copying of the data file into the temporary storage area. If the error is not corrected, then an error message is generated regarding the failed status of the retrieval. When all data files for the session request have been processed, the next session request is processed (block 430).

Figure 5:
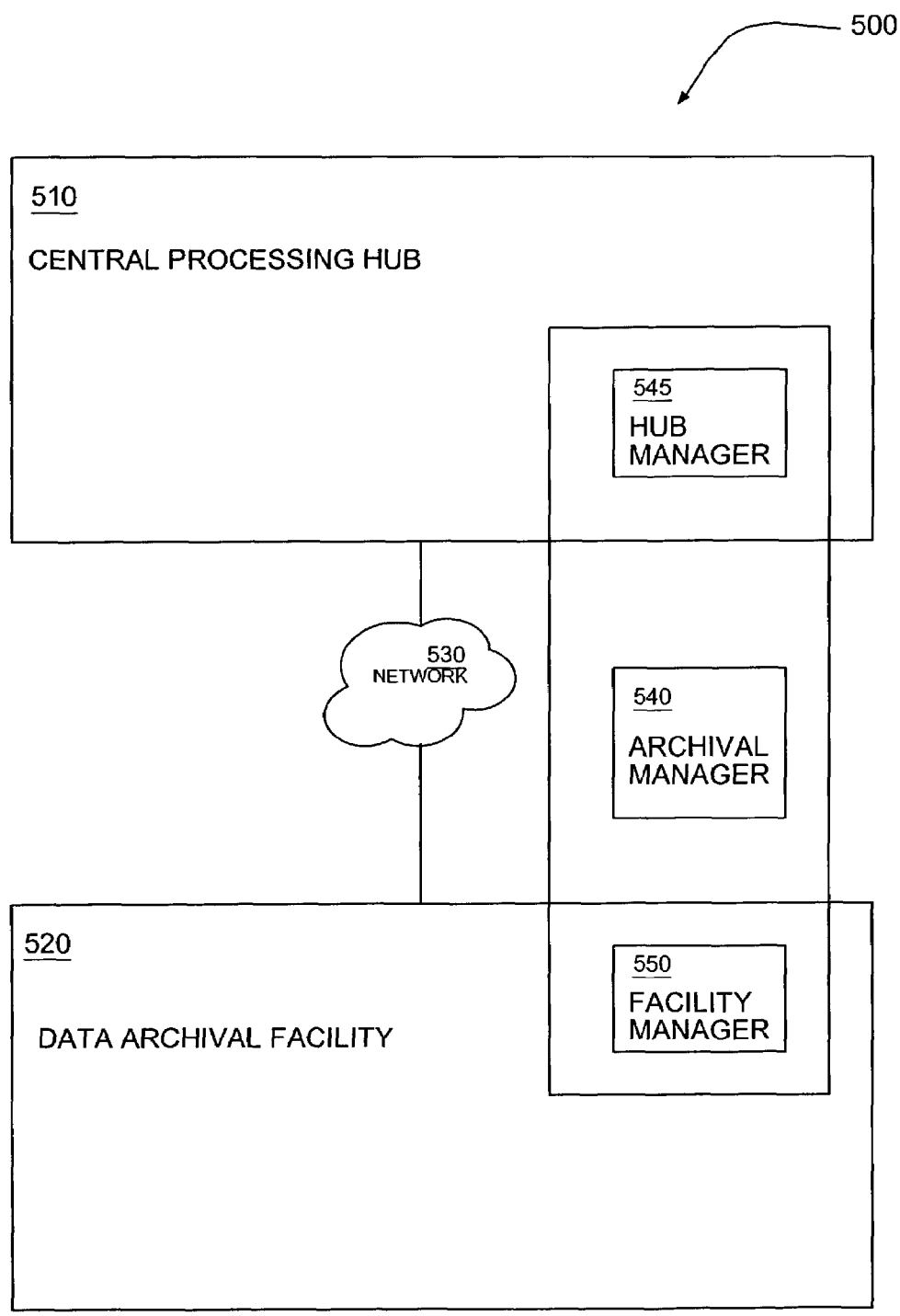
FIG. 5 conceptually depicts one embodiment of the data archival system according to the present invention.

FIG. 5 depicts one embodiment of a data archival system according to the present invention. Data archival system 500 includes Central Processing Hub 510, Data Archival Facility 520, and Archival Manager 540. Central Processing Hub 510 is connected to Data Archival Facility 520 by way of Network 530. Although not expressly shown, Central Processing Hub 510 and Data Archival Facility 520 typically consist of generally available computer hardware and software for use in processing and storing large amounts of data and may include high-end PC server(s) with dual or quad processors, dual power supplies, a large capacity Redundant Array of Independent Disks (RAID), floppy disks, DAT drives, CD-ROMs, high capacity storage devices, and network adapter. Network 530 may typically consist of one or more high speed, fault-tolerant communications lines and may include a local area network, wide area network, or Internet connection. Central Processing Hub 510 is designed to receive the data files and carry out the relevant processing order, including orders to archive the received data files and orders to retrieve previously archived data files. Data Archival Facility 520 is designed to receive, archive in an environmentally secure manner, and retrieve the data files.

Archival Manager 540 is a software application that includes Hub Manager 545, a software application which resides on Central Processing Hub 510 and Facility Manager 550, a software application which resides on Data Archival Facility 520. Although not explicitly shown in FIG. 5, multiple central processing hubs and multiple data archival facilities may exist; with Hub Manager 545 residing on each of the multiple central processing hubs and Facility Manager 550 residing on each of the multiple data archival facilities. Further, some or all of the data archival sites may be remotely located from the central processing hub. Generally, Archival Manager 540 coordinates and processes all requests for the archival and retrieval of data files.

In one embodiment of the present invention, Archival Manager 540 facilitates implementation of methods 100, 200, 300, and 400 of the present invention. Specifically, Hub Manager 545 performs methods 100 and 300 of the present invention and Facility Manager 550 performs methods 200 and 400 of the present invention. In an alternative embodiment, Archival Manager 540 may be present solely on the central processing hub or solely on the data archival facility and remotely process and coordinate all requests for the archival and retrieval of data files.

In a preferred embodiment, if an archive session request is presented to Central Processing Hub 510 (block 110), Hub Manager 545 retrieves the archive session request and the data files associated with the archival session request from Central Processing Hub 510 and validates the data files associated with the archive session request (block 120). If the validation of a data file fails (block 130), Hub Manager 545 generates an error report (block 135), and continues processing with the next data file in the current archive session request. The generated error report may include information on the nature and type of validation error and other information regarding the applicable archive session request and data file in which the error occurred so as to assist system operators with resolving the validation error. As previously noted, if a data file fails validation, its reference is removed from the current archive session request.

If the archive session request and associated data files are successfully validated, Hub Manager 545 reviews the status of Facility Manager 550 to determine whether an existing archive session is underway or pending at Data Archival Facility 520 (i.e., the transmission of data files for an existing archive session from Central Processing Hub 510 to Data Archival Facility 520 has not yet completed) (block 140). If an existing archive session request is not underway, Hub Manager 545 starts a new archive session (block 150), coordinates the transmission of the data files associated with the archive session request to a receive area at Data Archival Facility 520, and updates the relevant archival session records to indicate that an archival session is now underway.

If an archive session is currently underway (block 140), Hub Manager 545 queries Facility Manager 550 to determine whether any errors occurred while archiving the data files (associated with the applicable archive session request) (blocks 160 and 170). Typically, the query is accomplished by reviewing a pre-defined location for applicable error files that would be generated by Facility Manager 550 during the archival process had an error occurred in the archival process. If no errors occurred, then Hub Manager 545 updates the status of the applicable archive session request to indicate that such archive session request is no longer pending and that the data files associated with such archive session request have been archived (block 180) at Data Archival Facility 520.

If, however, an error is encountered in the import process at Data Archival Facility 520 (block 160), Hub Manager 545 halts the archival process, analyzes the relevant error file, and transmits an error message providing information on the relevant data file and archive session request information to the system operators for resolution (block 190). If an error is encountered in the staging process at Data Archival Facility 520 (block 170), Hub Manager 545 analyzes the relevant error log file, may or may not halt the archival process depending on the nature of the error and the data files to which it applies, and transmits an error message with relevant data file and archive session request information to the system operators for resolution (block 190).

Facility Manager 550 determines whether an archive session request is available for archival (block 210). If an archive session is available for archival, Facility Manager 550 determines whether all data files associated with the archive session request have been received into the receive area at Data Archival Facility 520 (block 215). When all of the data files associated with the archive session have been received at Data Archival Facility 520, Facility Manager 550 starts the import process (i.e., moving the data files from the receive area to the staging area for further processing and archival) (block 220). If an import error is encountered during the import process (block 225), Facility Manager 550 creates an error file with relevant data file and session request information (block 230). As previously noted, if such an error file is created, Hub Manager 545 will halt the archival process until the import error is addressed (block 235).

If the import process is successful (block 225), Facility Manager 550 releases the receive area (so that data files associated with another archive session request may be transmitted to Data Archival Facility 520), creates and maintains files on the import process for use by system operators, and starts the staging process for the imported data files (block 240). For each data file associated with the archive session request (block 245), Facility Manager 550 scans the data file (block 250), validates the data file (block 260), loads (i.e., archives) the data file (block 270), and updates status files on the archival process.

If Facility Manager 550 detects any errors during the scan process, the validation process, or the load process (blocks 255, 265, and 275, respectively), appropriate error messages with information on the data file and archive session request are generated (utilizing the information maintained during each applicable process) so as to assist system operators with addressing the applicable error (block 280). When all of the data files associated with the archive session request have been processed for archival, Facility Manager 550 marks the current archive session request as archived (block 285), and continues with processing the next archive session request. By implementing methods 100 and 200, Archival Manager 540 enables and provides for the efficient archival of data files between Central Processing Hub 510 and Data Archival Facility 520.

Regarding the retrieval of archived data files, if Hub Manager 545 detects a retrieval session request at Central Processing Hub 510 (block 310), Hub Manager 545 commences a retrieval process for each data file within the retrieval session request (block 320). As part of the retrieval process (block 320), Hub Manager 545 transmits a request to Facility Manager 550 for the applicable data file, determines if data files associated with the present retrieval request (or previous retrieval requests) are available for retrieval from Data Archival Facility 520, and if so, retrieves available data files from Data Archival Facility 520.

If Hub Manager 545 determines that an error occurred in the retrieval process (i.e., the data file is not available for retrieval, the retrieval may have failed, etc.) at Data Archival Facility 520 (block 330), Hub Manager 545 displays an error message with relevant data file information to the system operators so as to permit the error to be addressed (block 350) and continues with the retrieval process (block 320) for the next data file. If the retrieval process is successful, Hub Manager 545 retrieves the applicable data file from Data Archive Facility 520 and updates the applicable retrieval records to reflect the status of the retrieved data file (block 340).

Hub Manager 545 then determines whether additional data files remain to be retrieved (block 360), and if so, continues processing the retrieval of each available data file (block 320). The process is continued until all data files associated with the retrieval session request are processed. When all data files for the retrieval session request have been processed (block 360), Hub Manager 545 updates the archival records for the current retrieval session request, and continues with processing the next retrieval session request (block 370).

Upon determining that a session retrieval request is present from Hub Manager 545 at Data Archival Facility 520 (block 410), Facility Manager 550 creates a temporary storage area to process the data files associated with the session retrieval request. For each data file associated with the retrieval session request, Facility Manager 550 reviews the applicable data file locator information, makes a request to Data Archival Facility 520 to retrieve the data file from archive, copies (upon its availability) the data file into the temporary storage area (block 450), and updates the applicable catalog records so as to permit Hub Manager 545 to retrieve the data file from the temporary storage area. In a preferred embodiment, Facility Manager 550 determines the size of the data file(s) associated with the session retrieval request, determines if adequate storage space is presently available in which to retrieve the data file(s), and updates an applicable session file accordingly (i.e., the data file(s) were retrieved or sufficient space was not available for retrieval). Moreover, in a preferred embodiment, when all data files for the session retrieval request have been retrieved by Hub Manager 545, the temporary storage area created by Facility Manager 550 is released.

If an error is encountered with the retrieval of the data file from archive (i.e., the data file is not available for retrieval, the retrieval may have failed, etc.) (block 440), Facility Manager 550 displays an error message with relevant data file and retrieval session information to the system operators so as to permit the error to be addressed. If the retrieval error is corrected (block 470), Facility Manager 550 continues with the retrieval and copying of the data file into the temporary storage area. If the error is not corrected, then Facility Manager 550 displays an error message regarding the failed status of the retrieval. When the data files for the session request have been processed, Facility Manager 550 releases the temporary storage area and continues with processing the next retrieval session request (block 430). By implementing methods 300 and 400, Archival Manager 540 enables and provides for the efficient retrieval of data files between Central Processing Hub 510 and Data Archival Facility 520.

In a preferred embodiment of the present invention, all errors encountered in the archival of data files and all errors encountered during the retrieval of archived data files are processed, analyzed, and delivered to the applicable system operators by Hub Manager 545 so as to permit the centralized processing of error conditions. Hub Manager 545 periodically monitors Facility Manager 550 for applicable error files, retrieves such error files from Facility Manager 550, and processes the error files accordingly. By way of example, Facility Manager 550 creates a session file for each archive session request and each retrieve session request and updates the applicable session file during the relevant archive and retrieval processes. Thus, if an error is encountered during the import process or the staging process, applicable error information is compiled and written by Facility Manager 550 to the relevant session status file. Likewise if no errors are encountered, the relevant session file is updated to reflect the same. Finally, when the archival or retrieval process (as applicable) is completed, the relevant session file is updated to reflect the same. Session files generated by Facility Manager 550 are retrieved by Hub Manager 545 and processed accordingly. In this way, Hub Manager 545 is able to monitor and maintain the current status of each session request (as well as maintain detailed audit records for each session request) by reviewing the relevant session files. In an alternative embodiment, session files may be processed, analyzed, and delivered to the applicable system operators by Facility Manager 550 or both Hub Manager 545 and Facility Manager 550. To preserve system resources, applicable session files may then be deleted once marked as completed or after the session files have existed for a pre-defined time period (e.g., twenty fours hours).

It should be appreciated that portions of the present invention may be implemented as a set of computer executable instructions (software) stored on or contained in a computer-readable medium. The computer readable medium may include a non-volatile medium such as a floppy diskette, hard disk, flash memory card, ROM, CD ROM, DVD, magnetic tape, or another suitable medium.

As used herein the term "data file" is to be broadly read as encompassing any file or compilation of data, including serialized byte streams. Further, it will be appreciated by those skilled in the art that there are many alternative implementations of the invention described and claimed herein. For example, the embodiments described may utilize unique identifiers to identify each session request and each applicable data file so as to facilitate the processing of same and in order to maintain applicable processing records. Further, Archival Manager 540 may be implemented as a demon so that Archival Manager 540 remains dormant until applicable conditions associated with a session request occur.

It will be apparent to those skilled in the art having the benefit of this disclosure that the present invention contemplates a system and method for the improved electronic archival and retrieval of data between a central data processing facility and an associated data archival facility. It is understood that the forms of the invention shown and described in the detailed description and the drawings are to be taken merely as presently preferred examples and that the invention is limited only by the language of the claims.

What is claimed is:

1. A method for automatically archiving a plurality of data files between a central data processing facility configured to receive the plurality of data files and a data archival facility connected to the central data processing facility and configured to archive the plurality of data files, the method comprising:
   a) responsive to receiving an archive session request, validating the plurality of data files associated with the archive session request by verifying the data of each of the files;
   b) responsive to a successful validation of the archive session request, transmitting the validated data files from the central data processing facility to the data archival facility;
   c) responsive to receiving the validated data files at the data archival facility, validating the received data files for archiving; and
   d) responsive to a successful validation of the received data files, archiving the received data files; and
wherein the validation in step a) of the received archive session request transmitting and the transmitting of the validated files in step b) and the validation in step c) of the data files after transmitting are all performed before archiving the data files.

2. The method of claim 1 wherein step d) further comprises performing an import process, performing a staging process, performing a scanning process, and performing a validation process.

3. The method of claim 2 wherein step d) further comprises performing a load process in response to a successful import process, successful staging process, successful scanning process, and successful validation process.

4. The method of claim 1 further comprising: e) responsive to receiving a retrieval request to retrieve a data file, creating a temporary storage area for the receipt of the data file; f) retrieving the requested data file into the temporary storage area; and g) transmitting the retrieved data file to the central data processing facility.

5. The method of claim 4 further comprising: h) responsive to the occurrence of an error in the archival of the data files, resolving the error.

6. The method of claim 5 wherein resolving the error includes displaying data file information to a system operator.

7. The method of claim 1 wherein the aggregate size of the transmitted data files is restricted to a size based upon available data throughput between the central data processing facility and the data archival facility and the aggregate size of the data files previously received at the data archival facility and pending for archival.

8. The method of claim 1 wherein the aggregate size of the transmitted data files is selectively restricted by a system operator.

9. A computer-readable medium tangibly having a program of machine-readable instructions for causing a processor to perform a method for automatically archiving a plurality of data files between a central data processing facility configured to receive the plurality of data files and a data archival facility connected to the central data processing facility and configured to archive the plurality of data files, the method comprising:
   a) responsive to receiving an archive session request, validating the plurality of data files associated with the archive session request by verifying the data of each of the files;
   b) responsive to a successful validation of the archive session request, transmitting the validated data files from the central data processing facility to the data archival facility;
   c) responsive to receiving the validated data files at the data archival facility, validating the received data files for archiving; and
   d) responsive to a successful validation of the received data files, archiving the received data files; and
wherein the validation in step a) of the received archive session request transmitting and the transmitting of the validated files in step b) and the validation in step c) of the data files after transmitting are all performed before archiving the data files.

10. The computer-readable medium of claim 9 further having instructions for causing a processor to perform a method, the method comprising: performing an import process, performing a staging process, performing a scanning process, and performing a validation process on the data files transmitted to the data archival facility.

11. The computer-readable medium of claim 10 further having instructions for causing a processor to perform a method, the method comprising: performing a load process on the data files transmitted to the data archival facility in response to a successful import process, successful staging process, successful scanning process, and successful validation process.

12. The computer-readable medium of claim 9 further having instructions for causing a processor to perform a method, the method comprising: e) responsive to receiving a retrieval request to retrieve a data file, creating a temporary storage area for the receipt of the data file; f) retrieving the requested data file into the temporary storage area; and g) transmitting the retrieved data file to the central data processing facility.

13. The computer-readable medium of claim 12 further having instructions for causing a processor to perform a method, the method comprising: h) displaying data file information to a system operator in response to the occurrence of an error while performing the method for archiving a plurality of data files between a central data processing facility and a data archival facility.

14. A data archival system for implementing an automatic archival process on a plurality of data files comprising:

a central data processing facility configured to receive the plurality of data files;
　a data archival facility connected to the central data processing facility and configured to archive the plurality of data files; and
　an archival manager comprising a hub manager and a facility manager;
　wherein the archival manager is configured to cause:
　　a) responsive to receiving an archive session request, validating the plurality of data files associated with the archive session request by verifying the data of each of the files;
　　b) responsive to a successful validation of the archive session request, transmitting the validated data files from the central data processing facility to the data archival facility;
　　c) responsive to receiving the validated data files at the data archival facility, validating the received data files for archiving; and
　　d) responsive to a successful validation of the received data files, archiving the received data files; and
wherein the validation in step a) of the received archive session request transmitting and the transmitting of the validated files in step b) and the validation in step c) of the data files after transmitting are all performed before archiving the data files.

15. The data archival system of claim 14 wherein the data archival facility is connected to the central processing hub by way of a network.

* * * * *